BISTABLE FLIP FLOP CIRCUIT WITH MEMORY

Filed Aug. 31, 1959

2 Sheets-Sheet 1

INVENTOR.
DAVID F. HILBIBER

BY George A. Sullivan
Agent

INVENTOR.
DAVID F. HILBIBER
BY George C. Sullivan
Agent 2,982,870

BISTABLE FLIP FLOP CIRCUIT WITH MEMORY

David F. Hilbiber, Los Altos, Calif., assignor to Lockheed Aircraft Corporation, Burbank, Calif.

Filed Aug. 31, 1959, Ser. No. 836,995

6 Claims. (Cl. 307—88.5)

This invention relates generally to bistable electronic circuits, and more particularly to a bistable flip flop circuit which is capable of returning to its last state in the event of a temporary power failure.

In a variety of equipment, such as electronic computers, large numbers of flip flop circuits are employed, the states of which serve to store information for future use. The setting of these flip flop circuits to their desired states often takes a considerable amount of time, and these settings are constantly being changed, depending upon the programming of the equipment and the type of operation performed. If a temporary power failure happened to occur, the conventional bistable circuit now used in the art would not be capable of returning to the last state it was in just prior to the power failure. The information stored in these flip flop circuits, therefore, would be lost, necessitating resetting the circuits and rerunning the desired programming when power returns.

Accordingly, it is the object of this invention to provide a bistable circuit which is capable of returning to its last state in the event of a temporary power failure.

Another object of this invention is to provide a bistable circuit in accordance with the aforementioned object, which is capable of being switched by short duration trigger pulses, and which has a switching rate not appreciably less than that of conventional bistable circuits now used in the art.

Still another object of this invention is to provide a bistable flip flop circuit, in accordance with any or all of the preceding objects, which uses transistors and which requires only a minimum number of parts.

In a typical embodiment of the invention, the above objects are accomplished by means of a transistorized flip flop circuit incorporating a storage capacitor which cooperates with a plurality of silicon diodes serving as the flip flop coupling elements to store in the circuit, for an appreciable time after power is removed, information as to the last state of the flip flop circuit, thereby causing the circuit to return to this last state when power returns.

The specific nature of the invention, as well as other objects, uses and advantages thereof, will clearly appear from the following description and from the accompanying drawing in which.

Like numerals designate like elements throughout the drawing.

Figures 1, 2:
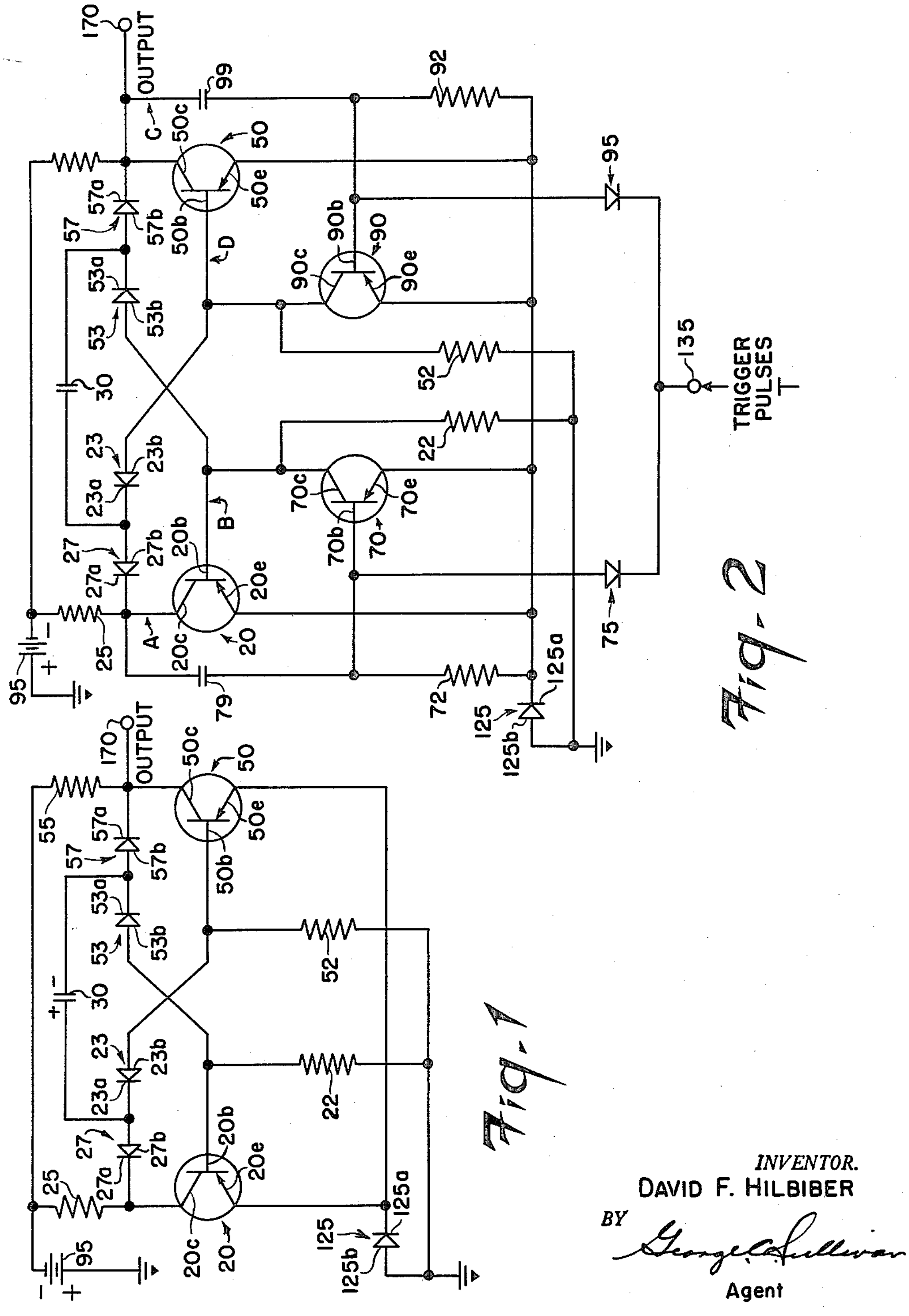
Figure 1 is a circuit diagram of a transistorized flip flop circuit which is capable of returning to its last state in the event of a temporary power failure, in accordance with the invention.
Figure 2 is a circuit diagram showing an extension of the Figure 1 circuit which permits the state of the circuit to be changed by relatively short trigger pulses.

In Figure 1, two PNP transistors 20 and 50 are connected to form a bistable flip flop circuit. The transistor 20 has its collector 20*c* connected to a negative power source 95 through a collector resistor 25, its emitter 20*e* connected to circuit ground through a silicon diode 125 poled in the same direction as the diode formed by the emitter 20*e* and the base 20*b* of the transistor 20, and its base 20*b* connected to circuit ground through a base resistor 22. Similarly, the transistor 50 has its collector 50*c* connected to the negative power source 95 through a collector resistor 55, its emitter 50*e* connected to the emitter 20*e* of the transistor 20 so as to be connected to circuit ground through the diode 125, and its base 50*b* connected to circuit ground through the base resistor 52.

The cross coupling networks for the transistors 20 and 50, which provide bistable operation thereof, comprise series connected silicon diodes 27 and 23 between the collector 20*c* and the base 50*b*, and series connected silicon diodes 53 and 57 between the collector 50*c* and the base 20*b*. The series connected silicon diodes 27 and 23 are poled in the same direction as the diode formed by the base 50*b* and the emitter 50*e*, and the series connected diodes 53 and 57 are poled in the same direction as the diode formed by the base 20*b* and the emitter 50*e*. Thus, the cathode 27*a* of the diode 27 is connected to the collector 20*c*, the plate 23*b* of the diode 23 is connected to the base 50*b*, and the plate 27*b* of the diode 27 is connected to the cathode 23*a* of the diode 23. Likewise, the cathode 57*a* of the diode 57 is connected to the collector 50*c*, the plate 53*b* of the diode 53 is connected to the base 20*b*, and the plate 57*b* of the diode 57 is connected to the cathode 53*a* of the diode 53. For operation in accordance with this invention, at least one of the diodes 27 or 53, and one of the diodes 57 or 23, must be made of silicon, or some other material whose "potential barrier" occurs at an appreciable voltage, for reasons which will hereinafter become evident. It is preferable, though, that all diodes be of the type having an appreciable "potential barrier."

A capacitor 30 has one end connected to the junction between the diode 27 and 23, and its other end connected to the junction between the diode 53 and the diode 57. As will hereinafter be described, the capacitor 30 operates in cooperation with the silicon diodes 27, 23, 53 and 57 to store information in the circuit which will cause the circuit to return to its last state in the event of a temporary power failure. The state of the circuit may be determined by suitable means (not shown) connected to an output terminal 170, which is connected to the collector 50*c* of the transistor 50.

In order to explain the operation of the circuit of Figure 1, the capacitor 30 will be temporarily ignored, and an arbitrary state will be assumed with the transistor 20 saturated and the transistor 50 cut off. In this assumed state, the voltage at the collector 20*c* will be close to zero because of the low impedance of the transistor 20 in the saturated condition. The current flowing to the base 50*b* of the transistor 50 through the diodes 27 and 23 will thereby be relatively small, holding the transistor 50 cut off as in conventional flip flop circuit design. The saturation current of the transistor 20 flowing through the diode 125 provides a small drop thereacross which acts as a bias to more positively cut off the transistor 50 when the transistor 20 is conducting. If desired the diode 125 could be replaced by a resistor or omitted.

Since the transistor 50 is cut off, the voltage at its collector 50*c* will be considerably greater (in a negative sense) than ground, that is, much closer to the voltage of the source 95. The circuit is designed, also in accordance with conventional flip flop circuit design, so that with the transistor 50 cut off, the current flowing to the base 20*b* of the transistor 20, as a result of current flowing through the collector resistor 55 and the diodes 53 and 57, is sufficient to maintain the transistor 20 in a saturated condition. It will be understood that if the other state of the circuit of Figure 1 were assumed with the transistor 50 saturated and the transistor 20 cut off, operating conditions would be the same as described above, except that the conditions for the transistors 20 and 50 would be reversed.

It will be evident that without taking into account the capacitor 30, the circuit of Figure 1 is essentially similar to a conventional form of transistor flip flop with the silicon diodes 27, 23, 53 and 57 serving merely to couple the collector and bases of the respective transistors. In a conventional circuit, therefore, other coupling elements could be substituted for these diodes, such as resistors. However, in accordance with the present invention the use of these silicon diodes in cooperation with the capacitor 30 imparts a memory to the circuit which permits it to return to its last state in the event of a temporary power failure. This will be explained by the following description of the operation of the invention.

In the assumed state of the flip flop circuit of Figure 1, with the transistor 20 conducting and the transistor 50 cut off, it will be seen that the capacitor 30 will be charged to the voltage between the collector 50*c* and the base 50*b* in the direction shown in Figure 1, as a result of current flowing through the collector resistor 55, the diodes 57 and 23, and the resistor 52. It will be understood that if the circuit were in its other state, with the transistor 50 saturated and the transistor 20 cut off, the capacitor 30 would charge in the reverse direction to approximately the voltage between the collector 20*c* and the base 20*b* of the transistor 20, as a result of current flow through the collector resistor 25, the diodes 27 and 53, and the base resistor 22.

If the power source 95 were now to be removed as a result of a power failure, both transistors 20 and 50 will cut off, since power is no longer available to supply the necessary currents. In a conventional flip flop circuit, this would inevitably result in the circuit losing all memory of the state it was in when power returns. In the circuit of Figure 1, however, the action of the capacitor 30 and the diodes 27, 23, 53 and 57 act to maintain stored information within the circuit which remembers the last state it was in prior to the power failure.

When the power source 95 is removed, and the transistor 20 is assumed to have been saturated just prior to power removal, the capacitor 30 begins to discharge at a relatively fast rate through the path comprising the diode 27, the collector base junction 20*c*—20*b* of the transistor 20 and the diode 53. This relatively rapid rate of discharge of the capacitor 30 continues until the voltage across the capacitor 30 is no longer sufficient to overcome the "potential barrier" of the silicon diodes 27 and 53. When this occurs, the current reduces to a magnitude of the order of $10^{-8}$ and $10^{-9}$ amperes, which is typical of the forward current flowing through a silicon diode when its forward voltage is less than the "potential barrier."

For the circuit of Figure 1 employing typical silicon diodes, the voltage across the capacitor 30 when the current reduces to this very low magnitude will be the significant value of approximately .25 to .30 volt, and this voltage will remain on the capacitor for a relatively long time. The amount of time is determined by the leakage current through the silicon diodes, the capacitance and internal leakage of the capacitor 30, and the leakage through other external paths. Leakage through other external paths is prevented by the diodes 23 and 53, since current flow therethrough is in the reverse direction, which is very high at all voltages below breakdown, and particularly so at voltages below the "potential barrier." Internal leakage of the capacitor 30 is prevented by the use of a low leakage capacitor, such as one made of mylar. The result is that the voltage on the capacitor 30 will remain above 0.1 volt for a considerable time, which may be as long as two minutes using a 0.1 microfarad mylar capacitor in a typical circuit.

Upon return of the power source 95, the bases 20*b* and 50*b* of the transistors 20 and 50 will both initially begin to go negative; however, a voltage on the capacitor 30 of the order of 0.1 volt has been found sufficient to cause the transistor which was initially saturated prior to power removal to again return to the saturation state, thereby returning the flip flop circuit to the last state it was in prior to the removal of power. The use of a .1 microfarad capacitor for the capacitor 30 in a typical circuit, therefore, will permit the circuit to return to the last state it was in, even after the absence of power for as long as two minutes. This is ordinarily more than enough time to connect a standby power source.

Although the above description assumes all of the diodes 27, 23, 53 and 57 are of the silicon type, and this is preferable, it is only necessary that at least one of the diodes 27 or 53 and one of the diodes 57 and 23 be of silicon or some other material whose "potential barrier" occurs at an appreciable value.

As described previously, when power is removed the capacitor 30 discharges through a first path comprising the diode 27, the collector-base junction 20*c*—20*b* of the transistor 20 and the diode 53 if the circuit was in a state such that the transistor 20 was saturated prior to power removal; and if the circuit is in the other state prior to power removal with the transistor 50 saturated, the capacitor 30 discharges through the path comprising the diode 57, the collector base junction 50*c*—50*b* of the transistor 50 and the diode 23. As long as either one of the diodes 27 or 53 in the first path or the diodes 57 or 23 in the second path has a sufficient "potential barrier" the capacitor 30 will maintain a sufficient voltage to return the circuit to its last state when power returns. Of course, if all the diodes 27, 23, 53 and 57 are not of the type which have a high "potential barrier" it will be necessary for those which are not of this type to have very high back resistances so as to prevent leakage through other external paths. Since a diode having an appreciable "potential barrier" will necessarily have a very high resistance in both directions at voltages below the "potential barrier" it is believed to be preferable to use such a diode for all the diodes 23, 27, 53 and 57, rather than other types of diodes where a very high back resistance is not easily obtainable. Also, the use of two diodes having appreciable "potential barriers" in the same path effectively doubles the "potential barrier" voltage so as to make it possible to retain a larger voltage on the capacitor 30, and thereby permit the circuit to remember its last state after power is removed for a longer time. Thus, the memory time can be increased not only by increasing the capacitor 30, but also, significant increases in memory time can be obtained by using additional numbers of diodes having appreciable "potential barriers" in series with one or more diodes in the Figure 1 circuit. Of course, the "potential barrier" of any path should ordinarily not be made so large as to deleteriously interfere with bistable operation or change of state of the circuit.

The flip flop circuit of Figure 1 may be triggered to change its state in a variety of well known ways, such as by applying a suitable cut-off pulse to the base of the saturated transistor (which is the transistor 20 in Figure 2 for the assumed initial state of the circuit). Alternatively, the saturated transistor 20 may be cut off by momentarily returning its base 20*b* to its emitter 20*e*, thereby cutting off the current flowing to the base 20*b*. The means for providing such triggering can readily be supplied by those skilled in the art, and a novel type of triggering means which is particularly advantageous for use with this invention will hereinafter be described in connection with the extended embodiment of Figure 2.

But first, the effect of the capacitor 30 on the switching time of the flip flop circuit of Figure 1 will be examined. If a cut off pulse is applied to the base 20b to cut off the transistor 20 (which is assumed initially saturated) in order to change the state of the circuit, the collector 20c will not rapidly rise as it does in a conventional flip flop circuit, because of the presence of the capacitor 30. Instead, the voltage of the collector 20c will slowly rise as a result of charging current flow from the source 95 through the resistor 25, the capacitor 30, and the diode 53 to circuit ground. It will thus be seen that the transistor 20 must be held cut off by the triggering pulse until the capacitor 30 is charged to a value such that the rising voltage at the collector 20c supplies sufficient conduction current to the base 50b of the transistor 50, to cause the transistor 20 to conduct to an extent which will produce cumulative action when the triggering pulse is removed, so as to switch the state of the flip flop.

It should be noted that charging current flow to the capacitor 30 is in the forward direction of flow through the diodes 27 and 53, and since the source voltage 95 is greater than the "potential barrier" of these diodes, these diodes will not contribute to the time required for the triggering pulse to be present in order to change the state of the circuit. This likewise holds for the diodes 57 and 23, where the change of state is from the transistor 50 saturated and the transistor 20 cut off, to transistor 20 saturated and the transistor 50 cut off. Thus, the diodes 27, 23, 53 and 57 do not in any way interfere with bistable flip flop operation, nor do they contribute to the time required for the circuit to change its state. The time required for the circuit to change its state, therefore, is dependent only upon the value of the capacitor 30 and the values of the associated collector and base resistors of the transistors, and not on the diodes 27, 23, 53 and 57. This is an important feature of this invention, since if a large resistor were placed directly in series with the capacitor 30, instead of, or in addition to, the diodes 27, 23, 53 and 57, in order to provide a circuit memory, this resistor would have the severe disadvantage of directly increasing the time required for the circuit to change its state. In most applications, the use of such a large resistor directly in series with the capacitor 30 to obtain circuit memory would so increase the time required for the circuit to change its state as to make its use prohibitive.

In fact, even a "change of state" time of the order of milliseconds is prohibitive in some applications, because suitable trigger pulses of a sufficiently long duration may not be available. To overcome this difficulty of requiring a triggering pulse equal to the "change of state" time, the extended embodiment of Figure 2 has been devised.

In Figure 2, additional circuitry is provided to permit the flip flop circuit of Figure 1 to be switched by relatively short trigger pulses, of the order of microseconds, applied at a single input. In Figure 2, a PNP triggering transistor 70 has its collector 70c connected to the base 20b of the transistor 20, its emitter 70e connected to the emitter 20e, and its base 70b connected to the collector 20c of the transistor 20 through a coupling capacitor 79. A base resistor 70 connects the base 70b and the emitter 70e of the triggering transistor 70. Similarly, a PNP triggering transistor 90 has its collector 90c connected to the base 50b of the transistor 50, its emitter 90e connected to the emitter 50e, and its base 90b connected to the collector 50c through a coupling capacitor 99. A resistor 92 connects the base 90b and the emitter 90e of the triggering transistor 90.

The operation of the circuit of Figure 2, whereby a short negative trigger pulse applied at the terminal 135, causes the flip flop circuit to change its state will now be described. A negative trigger pulse applied at the input terminal 135 passes through the diodes 75 and 95 to the bases 70b and 90b, of the triggering transistors 70 and 90, respectively. The magnitude of the trigger pulse is chosen so that the signals appearing at the bases 70b and 90b saturate the respective triggering transistors 70 and

90. The diodes 75 and 95 act to isolate the bases 70b and 90b from one another, and are poled in a direction so as to permit the negative trigger pulses which saturate the bases 70b and 90b to pass therethrough.

Since a saturated transistor acts as a very low impedance between its collector and emitter, the saturating of the triggering transistors 70 and 90 by the trigger pulse effectively connects together the base and emitter of each of the transistors 20 and 50. Thus, whichever of the transistors 20 and 50 are saturated will be effectively cut off when a trigger pulse is applied, while the other transistor which is already cut off will be relatively unaffected. If the transistor 20 is assumed initially to be saturated and the transistor 50 initially cut off, as was done previously, the application of a negative trigger pulse will thereby cut off the transistor 20 and have no significant effect on the transistor 50, which is already cut off.

As described before, if the capacitor 30 were not present, cutting off the saturated transistor 20 of the flip flop circuit for a very short time would be sufficient to change the state of the circuit. However, the capacitor 30 is present, and some means must be provided to maintain the effect of the presence of the trigger pulse, even after it has been removed. This is accomplished by the action of the coupling capacitors 79 and 99 operating in cooperation with their respective triggering transistors 70 and 90 and their respective flip flop transistors 20 and 50, as will now be described.

In the assumed state, with the transistor 20 saturated and the transistor 50 cut off, the coupling capacitor 79 has relatively little voltage across it because of the low voltage on the collector 20c of the saturated transistor 20. Consequently, when the saturated transistor 20 is cut off by a trigger pulse saturating the triggering transistor 70, a current flows through the coupling capacitor 79 to the base 70b of the triggering transistor 70 as the voltage on the collector 20c rises towards its cut-off value. The value of the coupling capacitors 79 and 99 are chosen with respect to the capacitor 30 so that this current flow maintains the triggering transistor 70 saturated for a sufficient time after the trigger pulse is removed to allow the circuit to change its state.

In regard to the action of the coupling capacitor 99, it will be seen that for the assumed state of the circuit, this capacitor 99 will have a relatively high voltage across it, because the transistor 50 to which it is connected is cut off and the voltage on the collector 50c is at its cut-off value. Thus, since the coupling capacitor 99 is already charged to the cut-off value of the collector 50c, there will be no current flow therethrough to saturate the triggering transistor 90 and hold the transistor 50 cut off, after the trigger pulse is removed. The transistor 50 is thereby free to become saturated when the voltage on the collector 20c of the transistor 20 rises to a value which brings on the cumulative action and changes the state of the circuit. It will be understood that the action of the coupling capacitors 77 and 99 just described is reversed if the circuit is initially assumed to be in the other state with the transistor 50 initially saturated and the transistor 20 cut off.

In order to thoroughly describe the present invention and make it possible for one skilled in the art to readily put it into practice, the following exemplary types and values of the components shown in Figure 2 are given. It is to be understood, of course, that these types and values are only exemplary, and the invention is not to be considered in any way limited by the presentation thereof.

| | |
|---|---|
| Transistors **20** and **50** | Type 2N393. |
| Transistors **70** and **90** | Type 2N344. |
| Diodes **27, 23, 53** and **57** | Type SGS42. |
| Diode **125** | Type SG22. |
| Voltage source **95** | 3.9 volts. |
| Trigger pulse voltage | 3.4 volts. |
| Capacitor **30** | 0.1 microfarad. |

| | |
|---|---|
| Resistors 25 and 55 | 2,200 ohms. |
| Resistors 22, 52, 72 and 92 | 22,000 ohms. |
| Capacitors 79 and 99 | 0.033 microfarad. |

A circuit constructed with components having the above-listed values has been found to be capable of returning to its last state in the event of a power failure for as long as two minutes. Using a microfarad capacitor for the capacitor 30 instead of the .1 microfarad capacitor listed above, this time can be extended to almost twenty minutes. Also, trigger pulses having a duration as short as ten microseconds are capable of changing the state of the circuit.

Figure 3:
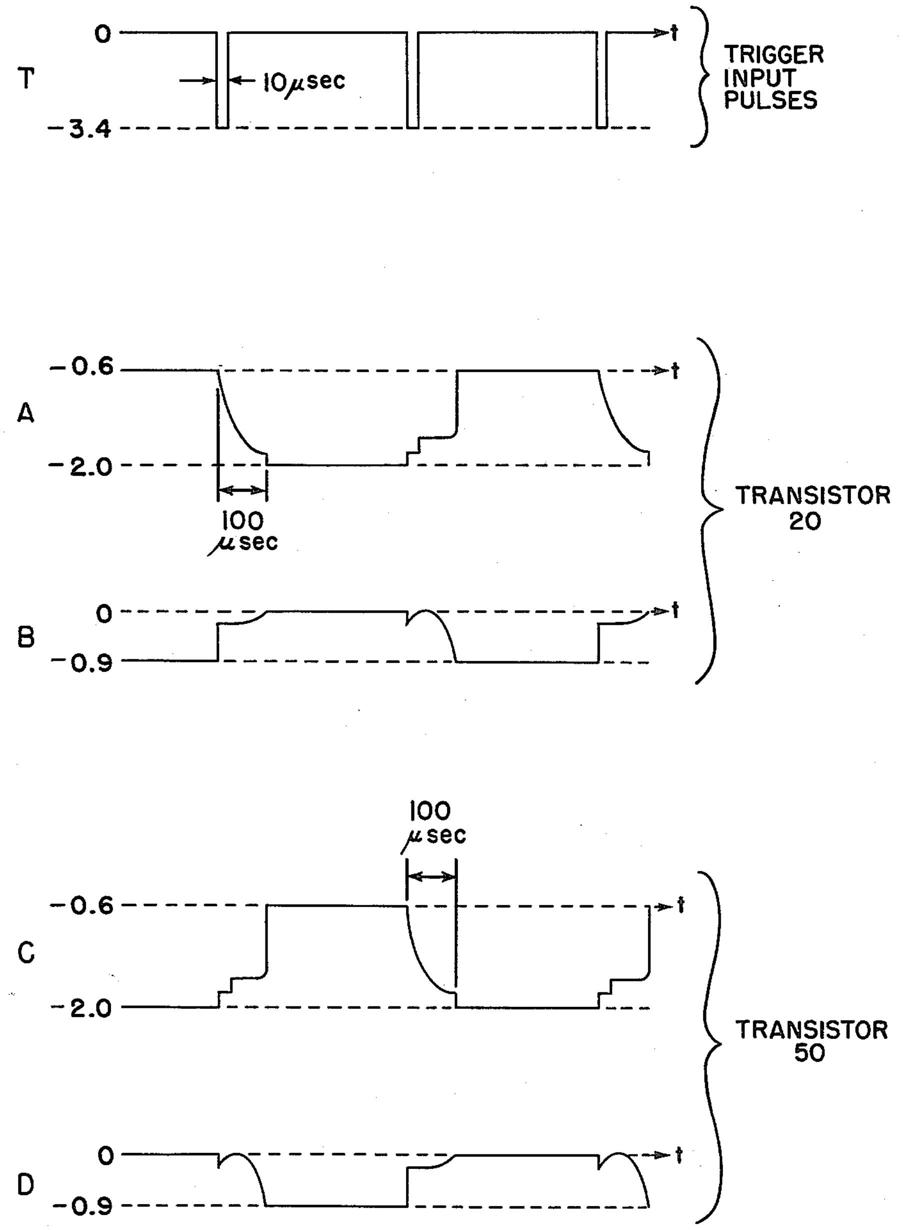
Figure 3 is a series of graphs illustrating the waveforms at various points in the circuit of Figure 2.

In order to provide a thorough understanding of the operation of the circuit of Figure 2, the graphs of Figure 3 are presented, illustrating the waveforms at various points in a circuit constructed with the components having above listed values. The letters T, A, B, C and D adjacent and to the left of the graphs in Figure 3 correspond to waveforme at points in the Figure 2 circuit designated by the same letters. The voltage values shown in Figure 3 are all given in volts.

It is to be understood in connection with this invention that the embodiments shown are only exemplary, and that various modifications can be made in construction and arrangement within the scope of the invention as defined in the appended claims.

I claim as my invention:

1. A flip flop circuit which is capable of returning to its last state in the event of a temporary power failure, said circuit comprising in combination: first and second amplifying elements, a first pair of like poled series connected diodes, a second pair of like poled series connected diodes, a power source, means connecting said power source and said amplifying elements and diodes for bistable operation, said first and second pairs of series connected diodes serving as coupling networks between said first and second amplifying elements, and capacitance means having one end connected between the junctions of said first pair of series connected diodes and the other end connected between the junction of said second pair of series connected diodes, said diodes being chosen so that at least one of said diodes in each of the discharge paths of said capacitance is of a type having a sufficient "potential barrier" to prevent said capacitance means from discharging below a predetermined voltage which would return said flip flop circuit to its last state in the event that said power source is removed, and said capacitance means being chosen in conjunction with said diodes so that the voltage across said capacitance means remains at least at said predetermined voltage for the amount of time after the power source is removed that it is desired that the flip flop circuit be capable of returning to its last state.

2. The invention in accordance with claim 1, wherein all of said diodes are of the silicon type.

3. A flip flop circuit which is capable of returning to its last state in the event of a temporary power failure, said circuit comprising in combination: first and second transistors, a first pair of like poled series connected diodes, a second pair of like poled series connected diodes, a power source, means connecting said power source and said transistors and diodes for bistable operation, said first and second pairs of series connected diodes serving as coupling networks between said first and second transistors, capacitance means having one end connected between the junctions of said first pair of series connected diodes and the other end connected between the junction of said second pair of series connected diodes, said diodes being chosen so that at least one of said diodes in each of the discharge paths of said capacitance is of a type having a sufficient "potential barrier" to prevent said capacitance means from discharging below a predetermined voltage which would return said flip flop circuit to its last state in the event that said power source is removed, and said capacitance means being chosen in conjunction with said diodes so that the voltage across said capacitance means remains at least at said predetermined voltage for the amount of time after the power source is removed that it is desired that the flip flop circuit be capable of returning to its last state, and means connected to said flip flop circuit to which trigger pulses are applied to change the state of the circuit.

4. The invention in accordance with claim 3, wherein said means connected to said flip flop circuit to which trigger pulses are applied to change the state of the circuit comprises: third and fourth transistors connected to said first and second transistors respectively, means for applying triggering pulses to saturate said third and fourth transistors, each one of said third and fourth transistors being connected to its respective one of said first and second transistors so that the saturation thereof cuts off its respective transistor, and second and third capacitance means connected between said first and third transistors and said second and fourth transistors respectively and chosen so that the effect of the trigger pulse is retained for a sufficient time after it is removed to permit the flip flop circuit to change its state.

5. A flip flop circuit which is capable of returning to its last state in the event of a temporary power failure, said circuit comprising in combination: first and second transistors each having at least emitter, collector and base elements, a power source, diode coupling means, and means connecting said transistors and said power source and said diode coupling means for bistable operation, each of said transistors being connected with one element common, one element serving as an input element and one element serving as an output element, said diode coupling means comprising first and second pairs of series connected diodes, the first pair of series connected diodes being connected between the output element of said first transistor and the input element of said second transistor and poled in the same direction as the diode formed by the input and common elements of said second transistor, the second pair of series connected diodes being connected between the output element of said second transistor and the input element of said first transistor and poled in the same direction as the diode formed by the input and common elements of said first transistor, and capacitance means connected between the junction of said first pair of diodes and the junction of said second pair of diodes, said diodes being chosen so that at least one of said diodes in each of the discharge paths of said capacitance means through which forward discharge current flows is of the type having a sufficient "potential barrier" to prevent said capacitance means from initially discharging below a predetermined voltage which would return said flip flop circuit to its last state in the event that said power source is removed, and said capacitance means being chosen in conjunction with the back resistance of said diodes so that the voltage across said capacitance means remains at least at said predetermined voltage for the amount of time after the power source is removed that it is desired that the flip flop circuit be capable of returning to its last state.

6. A flip flop circuit which is capable of returning to its last state in the event of a temporary power failure, said circuit comprising in combination: first and second transistors each having at least emitter, collector and base elements, a power source, diode coupling means, and means connecting said transistors and said power source and said diode coupling means for bistable operation, each of said transistors being connected with one element common, one element serving as an input element and one element serving as an output element, said diode coupling means comprising first and second pairs of series connected diodes, the first pair of series connected diodes being connected between the output element of said first transistor and the input element of said second transistor and poled in the same direction as the diode formed by the input and common elements of said second transistor, the second pair of series connected diodes being connected between the output element of said second transistor and the input element of said first transistor and poled in the same direction as the diode formed by the input and common elements of said first transistor, and means connected to said flip flop circuit to which trigger pulses are applied to change the state of the flip flop circuit, said last mentioned means comprising third and fourth transistors each having at least emitter, collector and base elements connected so that one element is common, one element is an input element and one element is an output element, the common and output elements of said third transistor being connected across the common and input elements of said first transistor, and the common and output elements of said fourth transistor being connected across the common and input elements of said second transistor, means for applying triggering pulses to the input elements of said third and fourth transistors to cause saturation thereof, the saturating of said third and fourth transistors effectively cutting off said first and second transistors, second capacitance means connected between the input element of said third transistor and the output element of said first transistor, and third capacitance means connected between the input element of said fourth transistor and the output element of said second transistor, said second and third capacitance means being chosen with respect to said first capacitance means so that the effect of the trigger pulse is retained for a sufficient time after it is removed to permit the flip flop circuit to change its state.

References Cited in the file of this patent

UNITED STATES PATENTS

| | | |
|---|---|---|
| 2,787,712 | Priebe et al. | Apr. 2, 1957 |
| 2,879,412 | Hoge et al. | Mar. 24, 1959 |
| 2,884,544 | Warnock | Apr. 28, 1959 |
| 2,924,788 | Maurushat | Feb. 9, 1960 |
| 2,965,767 | Wanlass | Dec. 20, 1960 |